July 23, 1940.  M. F. HILL  2,209,201
CHANGE SPEED GEAR
Filed Aug. 28, 1937  3 Sheets-Sheet 1
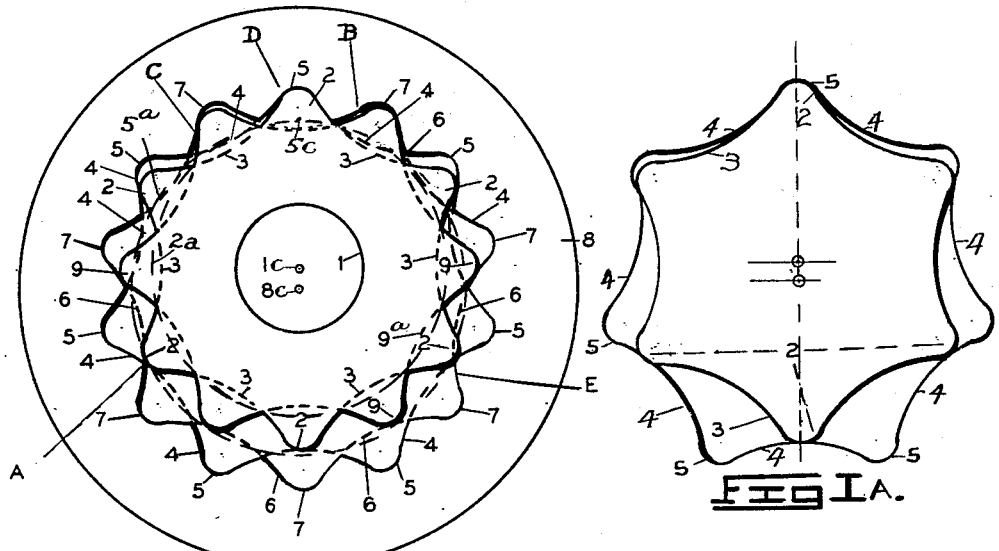
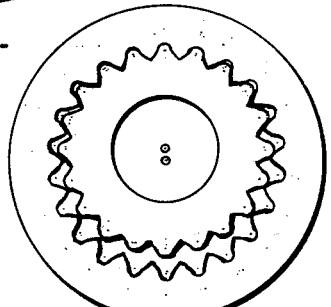
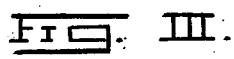
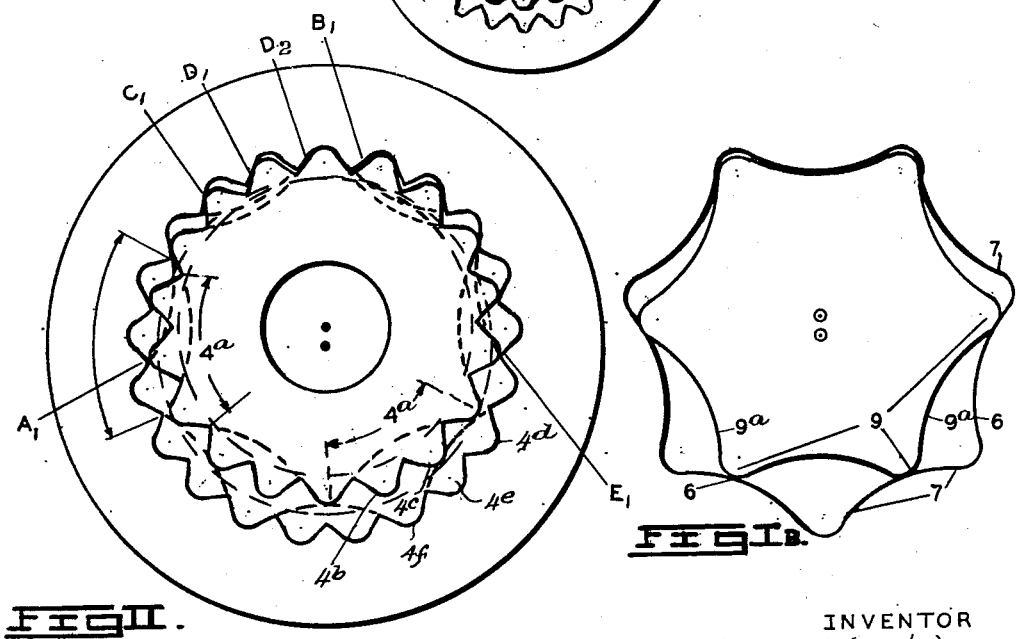
INVENTOR
Myron F. Hill

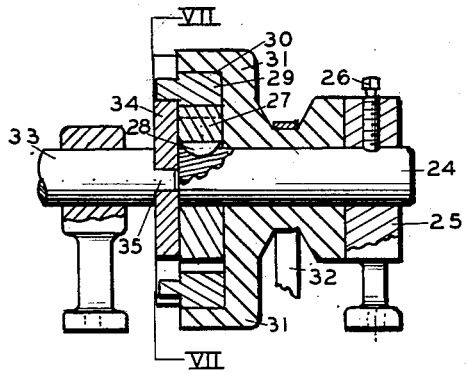
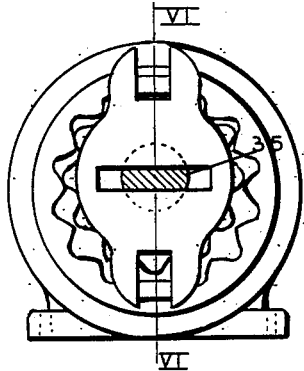
FIG. VI.    FIG. VII.
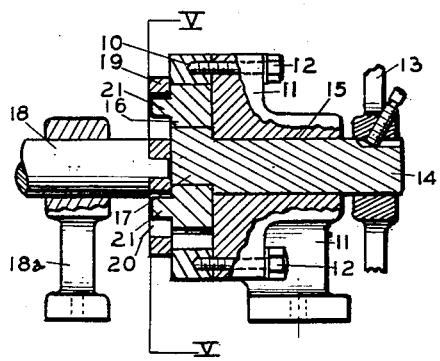
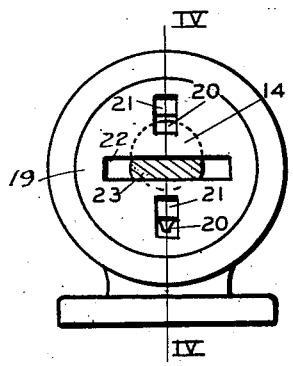
FIG. IV.    FIG. V.
INVENTOR.
Myron F. Hill July 23, 1940.  M. F. HILL  2,209,201
CHANGE SPEED GEAR
Filed Aug. 28, 1937  3 Sheets-Sheet 3
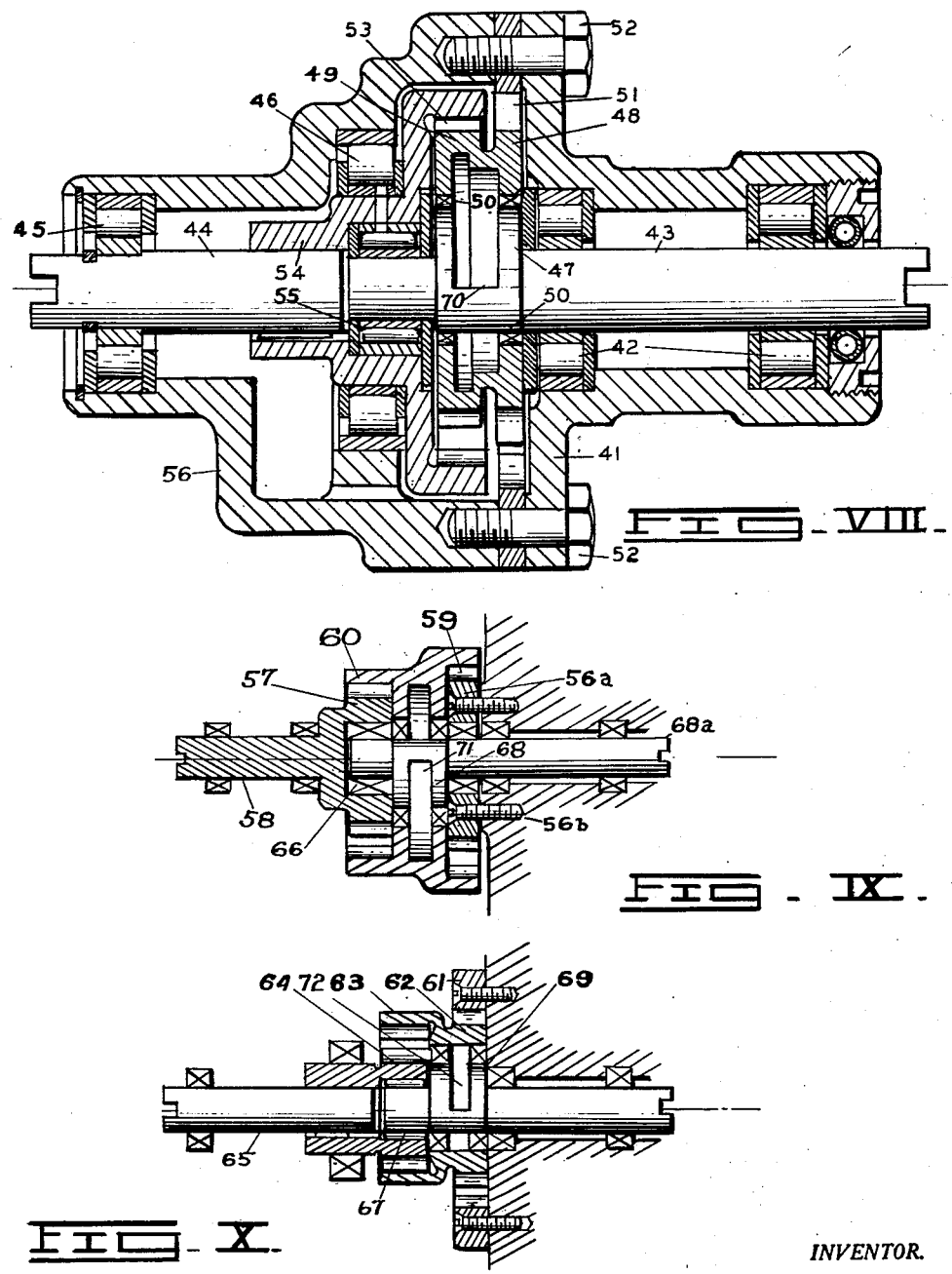
INVENTOR.
Myron F. Hill Patented July 23, 1940

2,209,201

UNITED STATES PATENT OFFICE 2,209,201

CHANGE SPEED GEAR

Myron F. Hill, Lansdowne, Pa.

Application August 28, 1937, Serial No. 161,513

6 Claims. (Cl. 74—309)

This application is a continuation in part of my Patent Number 2,091,317, granted August 31, 1937.

My invention, among other factors, comprises a novel arrangement of tooth curves, originally developed in connection with internal rotors for motors, compressors and liquid pumps described in my Patent No. 2,031,888; and also employs a plurality of sets of similar teeth interposed between the original rotor teeth to form internal gears. It is applicable to a variety of tooth ratios, the object being to provide powerful smooth runnings gears of small diameter and silent in operation.

Analysis of the internal change speed gear art shows three general types.

One type in which the pinion works inside of a ring gear with the differential motion taken off by many variations of the Oldham coupling.

A second type in which one member of each of two different pairs of gears are fastened together and roll around eccentrically while engaging their respective mates—using gears that have tooth differences greater than one.

And a third type which employs similar gears having a difference of one tooth.

Excepting cycloidal teeth, the art fails to disclose teeth with contours which maintain continuous contacts at steady angular velocities.

While cycloids have perfect continuous contacts theoretically, they have dropped out of commercial use because they wore badly near the pitch circle due to sharpness of curvature. Also gears having cycloidal teeth have to be centered with such great accuracy that the manufacturing tolerances customary in production were not permissible.

In my invention the teeth have substantial curvature at the pitch or ratio circle ensuring durability and can be assembled in a change speed gear with the usual tolerances.

When gears having a difference of one tooth were made with teeth shaped according to arcs of circles or involute curves, etc., they had irregular tooth contacts, noise, vibration, and a great deal of lost motion in order to work at all.

In the prior art of change speed gearing, a gear having 16 teeth for example, usually had a pitch circle radius 16 times the eccentricity of the gears. In my system, when applied to change speed gearing, a gear having 16 teeth might have a ratio circle radius four or eight times the eccentricity.

Gear teeth are relatively deeper and the whole mechanism may therefore be made smaller in diameter while the tooth strength is maintained. Moreover the mass eccentric throw may be less than that of the older types due to the smaller size of the mechanism. The counterbalance required for dynamic balance is therefore less and the whole unit being smaller, weighs less, and costs less to manufacture.

A high speed motor or turbine with its large momentum driving a slow heavy mechanism with its corresponding momentum thru the change speed mechanism of the prior art, was accompanied by noise and vibration. Not infrequently reduction gears in ships had to be replaced at costs involving huge sums of money.

In a change speed mechanism, one pair of gears drives a second pair of gears. When the first pair is driven by a heavy motor or turbine, the momentum of the latter tends to force the gears to rotate at uniform angular speeds. When the second pair of gears drives a slow heavy mechanism, the heavy momentum of the latter tends to force the second pair to rotate steadily too. But when tooth contours of both sets of the gears do not maintain continuous contacts at steady angular speeds, synchronism between them is lost. Smooth torque and transfer of power does not exist between the gear teeth. One tooth is retarded, another tooth is driven ahead, and tooth clashing results. Internal vibrations are established, intensified by the momentums of the driving and driven mechanisms. The teeth have to be made just so much heavier to withstand the extra stress. Even in a single reduction gear, this tooth clashing causes wear on the Oldham couplings and is not favored commercially.

My change speed gears have none of these faulty characteristics. The motor or turbine drives the first pair of gears smoothly and the gears transfer power from one to the other smoothly. The second pair receives this smooth torque and transmits it to the driven mechanism just as smoothly with silence and entire lack of vibration. No internal gear clashing and vibration exist.

It has been the practice heretofore to design gear tooth curves with relation to pitch circles. After pitch circles have been selected and located, curves crossing the pitch circles have been located by various means as in involute gears, including generation of a mating tooth curve. In so designing and determining gear tooth curves no attention has been paid to the "circroidal" addition, a factor hereinafter explained.

Owing to the confusion in dictionaries and other publications the meanings of certain terms herein are intended to be those described. Definitions of new terms are also supplied.

In my Patent 1,682,563, is described a system of rotor generation having for example a master generating circle, centered outside of a gear or rotor pitch circle, generating a curve or tooth for the pinion rotor or gear at steady angular speed.

As described in that patent, the distance of the center of the generating circle from its pitch circle had to be great enough to prevent undercutting the tooth curves being generated. If too close to the pitch circle it was impossible to generate curves that maintained contact with a mate having the same generating circle tooth curves, at steady angular speed in the driving region.

This distance from the pitch circle has been termed the "curtate addition" and it bears a definite relation to the form of curves being generated. Circoidal addition is a more comprehensive name. There is a minimum circoidal addition, greater than zero, for every tooth curve, or every portion of a tooth curve, having a radius greater than zero where it crosses the ratio circle. This fact has received no attention in gear design prior to my inventions in rotor and gear curves. The correct circroidal addition may be determined by experiment or by somewhat intricate calculations.

Heretofore gears have been actually generated by accurate machinery, which, thru failing to provide for a sufficient circroidal addition, failed to provide contact between teeth crossing full mesh at steady angular speed. The result of this faulty generation was hammering of teeth and at sufficient speeds, with consequent noise and vibration.

My invention in this case provides teeth for gears designed in accordance with the principle referred to, so that such noise is eliminated. The form of tooth curves is also shaped for silent durable action, where before similar teeth accentuated the hammering and noise.

In the drawings:

Fig. I shows internal gears having a 6 to 7 ratio with 12 and 14 teeth.

Fig. IA shows the original 6 and 7 tooth gear contours employed for building the gears in Fig. I.

Fig. IB illustrates how the same gear contours are revolved into the position in which they are shown superimposed upon the Fig. IA gears in Fig. I when the number of teeth is to be doubled.

Fig. II shows how three sets of teeth may be arranged producing an 18 to 21 tooth pair of gears, of the same tooth forms and ratio as before.

Fig. III shows a 10 to 11 ratio with 20 and 22 teeth.

Fig. IV is a sectional view on line IV—IV, Fig. V, illustrating how a 6 to 7 ratio of revolution may be converted into a 6 to 1 ratio or a 1 to 6 ratio by fixing the outer gear.

Fig. V is an elevation of Fig. IV at the line V—V, Fig. IV.

Fig. VI is a sectional view on line VI—VI, Fig. VII, showing how a 6 to 7 ratio of revolution may be converted into a 7 to 1 ratio or a 1 to 7 ratio by fixing the inner gear.

Fig. VII is an elevation of Fig. VI at the line VII—VII.

Fig. VIII shows a double change speed gear in section, with a doubled pinion roll.

Fig. IX shows another double change speed gear in section with a doubled annular gear roll.

Fig. X shows still another double change speed gear with a pinion and an annular gear doing the rolling.

Pairs of gears made according to my invention are so mated to each other that a plurality of continuous driving contacts between teeth having relative steady angular speed may result in high efficiency where one drives the other. A series of such teeth in internal gears are possible in continuously engaged driving parts between open and full mesh, so that the driving load is distributed over a plurality of driving engagements between the teeth, with a consequent reduced pressure for each tooth engaged. Reduced gear diameters and numbers and sizes of teeth accomplish the same or better results as compared with gears now generally used.

Heretofore systems of gears in common use have been based largely upon the cycloid, the involute and the flat face tooth. All of these forms of teeth, as used, produce rubbing action on line contacts between the engaged teeth over the driving range. Attempts to design gears in which a convex face on one drove a concave face on the other resulted in binding, or if generated, loose and noisy action.

Gear designers have apparently not understood the "looping action" of a cutting tool in its path around the pitch circle upon which the gear faces and flanks are erected, often resulting in the removal of the most important driving portions of the teeth during the generation of their curves, causing the noisy action due to variation in their relative angular speeds during rotation.

The angle at which the driving surfaces lie, while important, is of less consequence than a steady rolling relation between convex and concave curves at steady angular speeds. My preferred form provides a plurality of efficient simultaneous driving engagements.

By the term "driving range," I mean the range of contact between one tooth and the next one disregarding the multiple teeth, where the radial slip is the least at full mesh and nearest to the center line through the two gear axes, where the teeth are in driving engagement. Adjacent pairs of teeth also may be in engagement, depending on the ratios and modifications of my invention, with so little of sliding action that their driving efficiency is about equal to that of those in the aforesaid driving range. Still other teeth may engage with substantial sliding motion, and may wear more rapidly to relieve pressure so that they perform lesser driving functions except when wear occurs in the driving range, in which event such teeth may assume an appreciable part of the load. In my invention, in its best form, the wear and the load may be distributed over a plurality of driving teeth at all times, with less friction, wear and noise than with either the involute or the cycloidal gear tooth curves, or any other known gear curve type.

In some of the drawings, I have applied my invention to internal gears having ratios of tooth divisions differing by one which more clearly illustrate its principle. For example, the ratios of teeth may be 6 to 7; and other pairs of integers differing by unity. The tooth curves and the pitch ratio having one been determined by suitable generation in accordance with my inventions above referred to, the form arrived at may be multiplied, producing gears with two or three times as many teeth; and so on. In miscellaneous ratios differing by more than one the form of tooth curves designed in accordance with the principles of my invention, is as much superior to those generally used for gearing, as it is with the above mentioned ratios.

A tooth ratio of integers differing by unity, having continuous contacts between open mesh and across full mesh, the teeth of one of which slide or roll on the tooth curves of the other everywhere, some of the tooth curves of which are free to roll or slide over each other in contact but without pressure in certain ranges, has been patented by me in U. S. Patent 1,682,563, above referred to.

My present invention in one of its forms, modifies this invention and increases the number of teeth of the two gears, while still retaining the ratio of the numbers of teeth. Teeth and tooth spaces within each tooth division of both gears may be doubled, trebled, or even further increased as found desirable. If such additional sets of teeth be uniformly inserted around the gears, the teeth of each set will coact with each other and the driving relation in each additional set of teeth on the two gears will be precisely the same as that between the original set of rotor teeth. There results however increased smoothness and greater driving power proportional to the multiplied numbers of teeth which engage near where the pitch circles are tangent. This provides either greater durability or smaller sizes of gears, shafts and casings and lower costs of manufacture.

In such gear pairs it is not necessary that the supplementary sets of teeth be evenly spaced with or of exactly the same form as the original rotor teeth or that both sides of the teeth of meshing gears be symmetrical or have similar curves provided each and every tooth curve of a set of teeth be similar to and similarly disposed with respect to the curve of the meshing teeth of that set. If these conditions be fulfilled the gears will work correctly. However, it is preferable that the teeth of all sets be symmetrical, uniform and evenly spaced or indexed to avoid the need of special tools and special care in assembling them in correct positions as would otherwise be the case.

It will be apparent that the load which is carried by one tooth in the original pair of rotors may be divided between two, three, four, or more teeth in the modified form, depending upon the number of supplemental sets of teeth inserted. In the use of such multiples of the original, the forms and sizes of the teeth are such as to cause them to be out of contact some distance on either side of the center line at open mesh. In pairs of the usual current types of internal gears when used for pumps, it has been found necessary to fill in such a space with a crescent shaped spacer on both inside and outside of which the tops of gear teeth slide to retard leakage between the inlet and the outlet ports of the pump, but with my improved gear forms continuous contact during rotation between the teeth near to and on both sides of this crescent space at open mesh obviate the need of such a spacer.

Teeth of one type of gear once in general use consist of elements of cycloids generated by a point in a circle rolling within and without the pitch circle of each gear and as will readily be seen the portions of the cycloids used for the teeth are those parts of the epicycloid and of the hypocycloid lying nearest to the pitch circles; that is, the portions of the curves making contact over a substantial part of the driving range are those where the instant radii of curvature of the cycloids approach zero. The driving portion of these teeth is therefore mainly where their curved surfaces are sharpest, and such line contacts increase severity of action friction and wear, and shorten the life of the gears. This form of tooth has never been satisfactory and is no longer generally used.

In the generation of my tooth curves while any one of my systems of rotor generation are possible, I prefer to use as the basis of generation and to utilize considerable portions of the generated curves.

Referring now to Fig. I, which shows internal gears having a ratio of 6 to 7, the inner gear 1 has 12 teeth and the outer gear 8 has 14 teeth, the centers of the two gears being indicated at 1c and 8c. In designing these gears the generation system described in my aforesaid patent has been employed and the generating machine set forth in the patent granted to Hugo Bilgram and myself, U. S. Patent No. 1,798,059, is useful. Thus we have a pair of gears of 6 to 7 ratio with 12 and 14 mated teeth which will run together with the same properties as the original 6 to 7 set shown in Fig. IA, but with double the number of driving contacts running clockwise, pinion driven, the driving range is from B to C. Additional sets of teeth may be added in a similar manner. This is shown in Fig. II, in which each tooth division is provided with three teeth, having three times as many driving contacts. My patents describe "tooth divisions" based upon a ratio differing by one. The same tooth divisions are described in this case, containing not one tooth but two or more.

While a variety of tooth curves are of practical value in the use of my invention, I prefer to use the prepicroid system of tooth generation with a circular arc as a suitable curve with which to generate the gear contours described specifically in my Patent 2,031,888. I preferably differentiate between the curves that I use and some curves possible for teeth of the same height, such as the simple cycloidal type with sharp driving curvatures which are not durable. That is, I prefer to use curves in which the least instantaneous radius of curvature is appreciable and not those in which such radii of curvature diminish to zero, as is a cycloid, (a curve outlined by a point at the circumference of one circle as its rolls in or on another circle). Elliptic, oval, and irregular forms may be used to generate with, each with its main axis at different angles, providing symmetrical or unsymmetrical teeth capable of continuous driving contacts.

Referring again to Fig. I, it will be noted that the set of teeth 2 and 4 and spaces 3 and 5 correspond to the positions of rotor teeth shown in Fig. IA. Likewise the set of teeth and tooth spaces, 6, 7, 9 and 9a in Fig. I correspond to the positions in Fig. IB. Superimposing the set of tooth contours in the position IB on the set in IA produces the gears shown in Fig. I.

In Fig. II three sets of teeth and tooth spaces, with the same relation, are shown, preferably evenly indexed. The added teeth of the inner gear 4b and 4c are placed in one original tooth division, which is indicated by the arc 4a; and added tooth spaces in the outer gear are indicated at 4d and 4e, in the original tooth space curve 4f. The curves of all sets are preferably duplicates and evenly indexed in which case there is freedom of assembly in any relative gear position.

In order to produce my preferred form of gear teeth, a blank for the inner gear curve may be mounted on the aforesaid generating machine in my Patent 1,798,059, the two worm shafts being geared directly together to rotate in opposite directions from each other at the desired speed ratio, and a milling cutter having a diameter large enough to generate the narrow tooth shape shown, is adapted to cut the blank. The blank may be of tool steel suitable for subsequent hardening. A contour is generated in accordance with the principles set forth in my Patent No. 2,031,888 so that the six tooth gear contour in Fig. IA outlined by the tooth curve 2 and the corresponding tooth spaces 3 results. This tool may be hardened and employed to generate the teeth on the outer gear, using a Fellows gear shaper by disconnecting the backing off mechanism and the steady feed, and feeding the slowest Fellows gear ratio drive intermittently (by hand if need be) between cutting strokes. A blank is prepared, shaped roughly to such contours, so that the first entering cut is not too heavy or severe. The seven space contours 7 and the corresponding teeth 4 as shown on the outer gear form in Fig. IA are thus cut. The gear tool is then rotated angularly around its pitch circle into a position with relation to the blank to cut the second series of seven space curves 5 in the outer gear, thus dividing each tooth 4 into two teeth. The blank for the outer gear 8 is preferably previously rough machined so as to make the first or entering cuts easy ones. If this blank be made of tool steel it may then be hardened and used as a shaper tool to generate the inner gear 1 directly with its two sets of tooth contours 2 and 9, either in the Bilgram Hill generator above referred to, or in a Fellows gear shaper as described above.

Additional sets of teeth may be found in the same way as is shown in Fig. II, where each tooth division has three teeth. It is not essential that the indexing of the extra sets of teeth be such as to locate the added series of contours evenly indexed between the first series, since whatever variation exists in one gear for generation is repeated in the generated gear. In these multiplied ratios the teeth of one set of curves on one gear never engage other than the respective teeth of that set on the other gear if they are assembled in the original generated relation. In Fig. I contours 2 and 4 engage only contours 5 and 3, so that even if the indexing be not even as between the original set and the added teeth they will always engage correctly if they have been assembled in the generated relation. However, if the teeth are duplicates and have been evenly indexed they may be assembled in any position so that it is better in practice to make the teeth duplicates and the indexing uniform throughout.

The result of these contours is that in Fig. I, one side of a tooth 4 travels with a sliding contact on tooth 2 from A to B, and can drive it in a clockwise direction. Or tooth 2 could drive tooth 4 in an anti-clockwise direction from B to A. This is a continuous contact having at full mesh the greatest amount of rolling action in this gear as well as the largest relative area of contact between the teeth so far achieved, due to the convex tooth curve 4 rolling in the generated concave curve 3, at steady angular speed. Between B and C the contacts have nearly a pure rolling contact since the pitch circles lie closest together. The wear within this range is so slight as to be negligible over long periods of time. The wear from A to C is more rapid since the contact becomes more and more a sliding line contact of the character of involute gears as they approach open mesh.

As the gears travel in a clockwise direction the teeth part slightly to the left of B and the driving load is then carried slightly to the left of D and C. To the left of C, the contact is such that ever sharper convex curvatures toward open mesh engage on line contacts. Between C and B the driving contact is distinctive in my system as there are at least two convex toooth curves simultaneously engaging concave tooth space curves at steady speed; and, if greased, with substantial pressure areas. At D and B, for example, the presence of a lubricating film results in the distribution of the working pressure over a wide area, due to the face of one tooth lying closely against the flank of the other. In face there is a plurality of teeth under the driving load having this ideal relation to an extent.

Also, the pressure angle varies, an important factor in reducing radial sliding action in a tooth division at full mesh. Different master forms produce curves having different radii of curvature with their respective curtate or circroidal additions and their own ranges of pressure angles. The radial slide between them as they travel from C to D and from D to B is slight, owing to the close proximity in these regions of their pitch circles 2a and 5a to the point of tangency 5c. E indicates where the teeth of one gear begin to leaves the teeth of the other gear as they approach open mesh when revolution is clockwise. Up to this point E, however, the teeth may maintain tight relations. In my system, engagements between the teeth extend over a quadrant or even almost a half circle depending on the ratio, greatly reducing the tooth pressure per unit of area.

Certain modifications of this system of gearing are possible. While such modifications involve some sacrifice of some of the new results described they do not sacrifice all of them, since the system may be utilized with a Fellows gear shaper to generate many other desirable ratios of teeth at steady speed as for instance, three to seven, thirteen to seventeen, etc.

Looking at my invention from another angle, small teeth on a generating form having faces with a curvature greater than zero at the pitch or ratio circle, may be selected for purposes of generation. Such a tooth may be bisected on a radial line and the two halves then separated angularly on the ratio circle, other similar curves being inserted to complete the convexity of the tops of the teeth, and such a compound form used to generate the mating gear. The centers of curvature have to be so disposed outside of the pitch circle of the generated gear, but as near to its as may be safe in accordance with my invention to prevent undercutting the engaging driving faces of the generated mating teeth. Many variations of such a method are possible, and it is applicable to external gears, worms, mitre, skew, helical, elliptical and mongrel forms of gearing.

My gears are also capable of producing various reduction ratios by epicyclic revolution. Thus, if either the outer or the inner gear be fixed in position and the other rolled around within or without it as the case may be, by applying the rotational action of the rolling gear to a shaft by any of the well known or other ways of accomplishing this application, speed ratios of 2 to 1; 3 to 1; 4 to 1; 5 to 1; and in fact odd ratios etc. may be obtained. By use of a suitable pair of gears, a 3 to 1 ratio of revolution may be obtained from gears having a 2 to 3 tooth ratio, holding the inner gear fixed; or the same ratio of revolution may be obtained from gears having a 3 to 4 tooth ratio by fixing the outer gear.

Fig. IV shows the 6 to 7 ratio gear set for example in Fig. I incorporated with fixtures to produce a change speed gear for a ratio of 6 to 1 or of 1 to 6, as may be desired. The Oldham coupling, combined with the "epicyclic train" principle may be used for this purpose. This epicyclic train effect is produced by a plural tooth drive added so that the revolving gear undergoes a motion of the translation by an eccentric journal about the fixed axis and at the same time a rotation about its own axis with plural tooth driving contacts. The arrangement is made as shown in Fig. IV and V of gears with the six to seven ratio, the outer gear 10 being fixed to the gear casing or bracket 11 by the screws 12 and the pinion made to rotate by means of a wheel or pulley 13 fixed to a shaft 14 journalled in the bracket 11 at 15, and the inner gear 16 journalled on the crank 17. There results a reduction in speed of the shaft 18, transmitted thereto by the Oldham type slotted face plate 19, so that for six revolutions of the pulley 13, the shaft 18 will rotate once. It will readily be seen that by reversing the motion and driving the gear 16 by the shaft 18 and Oldham clutch plate 19 a ratio of one revolution to six, increasing the speed, will be obtained. The slotted plate 19 and the tongued shaft 18 in the slot 20 permit a ready transmission of motion without binding. The slots 20 receive the lugs 21 of the pinion 16 and slot 22 receives the tongue 23 of shaft 18. By this means the shafts 14 and 18 rotate at steady angular speed at their geared ratio, and on the same axis.

Figs. VI and VII show an adaptation of the same epicyclic train principle in which the inner gear is fixed and the outer gear revolves. Using the same gear ratio of 6 to 7 or 12 to 14, this change of speed is in the ratio of seven to one or of one to seven as required. The shaft 24 is held fixed in the bracket 25 by means of the set screw 26, the pinion 27 being keyed to shaft 24 by the key 28. The outer or annular gear 29 is journalled at 30 in the member 31 so that its center is revolved about the axis of the shaft 24 by the belt 32 and the motion transferred to shaft 33 by means of the Oldham slotted member 34 and the tongue 35 of the shaft 33. The result is that for every seven revolutions of casing 31, shaft 33 revolves once. By reversing the motion and driving shaft 33 a ratio of one to seven is obtained.

Although in both of these speed change gear arrangements I have shown a particular method of making the speed change I do not limit myself to this particular method of connecting the differential shafts but may accomplish this in a number of ways with satisfactory results with my new gears.

The several systems of tooth curves described herein may be inter-mixed on different teeth, or on different sides of the same teeth, or both, without departing from the scope of my invention. This includes rotors differing by one tooth.

Portions only, of the aforesaid curves may be used, particularly where centrifugal force or inertia may be depended upon to make up for what the portions might lack in maintaining steady angular speed of one with relation to the other.

My invention relates also to double change-speed gears. They comprise two pairs of internal gears having a common dimension upon which the pitch or ratio circles for each pair are calculated. Their ratio circles preferably have a common eccentricity and the numbers of teeth in both pairs of internal gears may vary by one or multiples of one.

For example, if two pairs of gears are employed in a variable speed gear system, one pair may have 25 and 26 teeth, and the other pair 24 and 25 teeth, the eccentricity being the same for both pairs.

If gears are employed which have 50 and 52 teeth in one pair and 48 and 50 in the other pair, the common difference is 2, which is an integral multiple of 1. In this case their ratio circle radii still vary in the proportion of 25 to 26, and 24 to 25 respectively.

Applicant's change speed gear principle, due to the convex-concave contact makes possible a continuous engagement over an arc of 120° more or less. Such gears may be based upon a difference of one or two or more, depending on the ratio desired. Other conditions being the same, the difference either in numbers of teeth, or the ratio fixes the size of the teeth. If applicant's teeth are doubled in number they may have the same curves for driving as they had before being doubled, hence heavy and strong, the convex teeth engaging the concave teeth over a long arc, providing shockproof strength and the distribution of the driving stress over greater numbers of teeth. Change-speed gears have varying loads depending on the ratio. The pyramidal forms of applicant's teeth are better adapted to carry the varying loads. Ordinarily, with gear teeth having the same strength, doubling their number also doubles the size of the reduction gear construction. But this is not necessarily so with the gears in this invention, since the teeth may have the same sized driving curves doubled or not. Ordinary gears have at most two, rarely if ever three, teeth in contact at once, for any ratio. The teeth in this invention may have up to very large numbers of teeth, in contact at the same time sharing the load.

That my double change speed gear has great flexibility as to ratios is evident from Figs. VIII, IX, X.

In Figure VIII, for example, a casing member 41 may contain bearings 42 locating a shaft 43 having as its axis that of the outgoing shaft 44 which is located by the bearings 45 and 46 at the other end of the gear casing 56. Either shaft 44 or 43 may be the driven one. If shaft 43 drives, the reduced speed is at shaft 44.

Shaft 43 carries, fixed to it, an eccentric or crank arm 47, upon which are mounted two pinpions 48 and 49 upon rollers 50, the pinions being fixed to each other to rotate together. Pinion 48 may be rolled around inside of the outer gear 51, which may be controlled or fixed by bolts 52. If the outer gear 51 is fixed stationary, the pinion 48 rolls or turns backward one pinion tooth division for each complete rotation of the shaft 43 and cam 47; the pinion 49 turning with it. Pinion 49 is at the same time rolled around in inside of its outer gear 53, the hub 54 of which is fast to the shaft 44, to drive or turn with it.

These gear relations are made possible by my novel tooth curves set forth in my Patents No. 1,682,563, and No. 2,031,888 and in my Patent Number 2,091,317. The tops of the teeth and the bottoms of the tooth spaces may be modified or undercut where not needed for tooth engagement. Either side of every tooth on one or both sets of mating gears may be shifted or side stepped to narrow the teeth to provide back lash. This eliminates the running in of tight gears as a factory operation and makes them easier to assemble.

The gear 51 may be bolted between the two casing members 41 and 56.

It will be noted that some ratios may have more nearly the same numbers of teeth which makes possible smaller and more economical construction. Also that a gear may be fixed as a part of the casing.

Calculating the speed ratios of such constructions, let us assume that the fixed annular gear 51 in Fig. VIII has a ratio circle with a radius equal to A times the eccentricity of the gears; that the pinion 48 has a ratio circle radius equal to B times the eccentricity; and the gears 49 and 53 have ratio circles respectively equal to C and D.

Also $A-B=D-C=1$.

Then by each pair of gears separately we have:
1. One revolution of the shaft 43 rotates the gear 48 backward 1/B revolutions.
2. One revolution of the shaft 43 would rotate the gear 49 around in the annular 53, 1/C revolutions, if the gear 53 were stationary.
3. Gear 53, if driven by gear 49 (other factors excluded) would rotate C/D revolutions for each revolution of gear 49.
4. Gears 48 and 49 are fastened together, so their combined effect on gear 53 is $1/C-1/B$.

Combining these elements we have to formula $$(1/C-1/B)C/D = \frac{\text{One revolution of shaft 44}}{\text{No. of revolutions of shaft 43}}$$

Whether the change speed gear shafts 43 and 44 rotate in the same direction or not depends upon the positive or negative value of the equation $1/C-1/B$. If it is positive both shafts rotate in the same direction.

When we desire a given speed ratio, values are tried for B, C, and D, remembering that $C+1=D$. The formula then becomes $$(1/C-1/B)C\sqrt{C+1} = \text{ratio},$$

and by assuming a value for either B or C we can find the values required for A and B because $C+1=D$ and $B+1=A$.

Suppose we wish to obtain a reduction of 1:625.

Let us assume that $C=24$, then $C+1$ is 25. Substituting in the formula, we have $$(1/24-1/B)24/25 = 1/625$$

which when solved for B gives the value 25.

Therefore we know that the value for A is 26, B is 25, C is 24, and D is 25.

With the radii of the ratio circles established, teeth are then designed for them and may be multiples of A, B, C, and D, such as 52, 50, 48, and 50 respectively or 78, 75, 72, and 75 respectively.

From these observations it is clear that the construction in Fig. VIII may be used to change speed as well as change the direction of rotation of the shafts. This is due to the fact that gear 51 may have less teeth than gear 53. If it has more teeth the shaft would turn at a changed speed in same direction.

In Fig. 9 is shown another form in which one pinion 56a is fixed by screws 56b and the other 57 attached to the change speed shaft 58. In this case the two annular gears 59, 60 are attached to work as a unit and to be rolled around the pinions by the cam 68 and shaft 68a. As the annular 59 is rolled clockwise around its pinion 56 it turn forward an angular distance equal to 360° divided by the radius of the ratio circle meaured in terms of the eccentricity. This construction is suitable for low reductions as 1:1.7 or 1:2.5 but is not adaptable for reversing. Shaft 58 always rotates in the same direction as shaft 68a and cam 68.

The formula adapted to the construction in Fig. IX becomes $$(1/A-1/D)D/C = \frac{\text{1 revolution of driven shaft}}{\text{No. of revolutions of drive shaft}}$$

In Fig. X is shown another combination in which the annular gear 61 is fixed, its pinion 62 attached to the annular gear 63, the pinion 64 of which is attached to the shaft 65. This is useful for low ratios, it being understood that there are required enough teeth in the gears to provide an effective drive. In this case the ratios of the two pairs of gears are added together and the shafts run in reverse directions or not, according to the numbers of gear teeth.

It adds much to the effectiveness of this gear to provide the bearing 55 in Fig. VIII to center the adjoining ends of the two shafts to each other.

Such a bearing is indicated at 66 in Fig. IX and at 67 in Fig. X.

The eccentrics 47, 68, 69 may be proportioned and have undercuts 70, 71, 72 to offset the eccentric masses of metal to more nearly balance them. In fact, with suitable widths of the cams and undercuts, the eccentric weights in the cams and rolling gears (whose centers of gravity travel around with the cams) may be exactly balanced for high speed rotation with little or no vibration.

The various bearings corresponding to 50, 45, 55 and 42 are indicated in Figs. IX and X. Portions of the casings in the last two figures are omitted but may correspond to 56 in Fig. VIII.

Some of the features of my invention have still other combination possibilities, all of which novel combinations lie within the field of my invention.

I claim:

1. In a change speed gear, in combination, a first drive shaft located upon a main axis, and internal annular gear and a pinion gear meshed within it, eccentric means on said shaft to rotate one around the axis of the other, a second drive shaft located upon a different axis from that of said rotated gear, and transfer means rotated by said rotated gear rotating said second drive shaft, said meshed gears having tooth driving contours whose smallest curves have greater radii of curvature than the end portions of cycloids, said driving contours generative of each other at uniform speeds, and having their centers of curvature sufficiently far from their axes for said generative relation, said generative relation determined by a master form and by its travel along a circroid traced by a point on the extended radius of one ratio circle as it rolls without slip on another ratio circle, said driving curves having the form of teeth generated by ratio circles the proportions of whose radii differ by one.

2. In a change speed gear, in combination, a first drive shaft located upon a main axis, and internal annular gear and a pinion gear meshed within it, eccentric means on said shaft to rotate one around the axis of the other, a second drive shaft located upon said main axis, and transfer means rotated by said rotated gear rotating said second drive shaft, said meshed gears having tooth driving contours whose smallest curves have greater radii of curvature than the end portions of cycloids, said driving contours generative of each other at uniform speeds by ratio circles the proportions of whose radii differ by one and having their centers of curvature sufficiently far from their axes for said generative relation.

3. The combination claimed in claim 1, with the teeth of one of said gears having entirely convex curves engaging entirely concave curves on the teeth of the other gear.

4. The combination claimed in claim 1, with the teeth of said annular gear having entirely convex curves engaging entirely concave curves on the teeth of the pinion gear.

5. The combination claimed in claim 1, having said transfer means comprising a second pair of similarly generated gears, one an internal annular gear, and the other a pinion gear meshed within it.

6. The combination claimed in claim 1, having said transfer means comprising a second pair of similar gears, one an internal annular gear, and the other a pinion gear meshed within it, said eccentric means including centrifugal balancing means located within and betweeen said gears.

MYRON F. HILL.